United States Patent
Xu et al.

(10) Patent No.: US 10,990,766 B2
(45) Date of Patent: Apr. 27, 2021

(54) METHODS AND DEVICES FOR PROCESSING TEMPLATE DATA, REQUESTING TEMPLATE DATA, AND PRESENTING TEMPLATE DATA

(71) Applicant: Tencent Technology (Shenzhen) Company Limited, Shenzhen (CN)

(72) Inventors: Hongcheng Xu, Shenzhen (CN); Junwei Zheng, Shenzhen (CN); Hao Chen, Shenzhen (CN); Xing Lin, Shenzhen (CN); Hongqiang Chen, Shenzhen (CN); Weijian Chen, Shenzhen (CN); Wei Li, Shenzhen (CN); Xialun Lai, Shenzhen (CN); Tianzhi Liang, Shenzhen (CN); Zehao Zhang, Shenzhen (CN); Cunjin Li, Shenzhen (CN); Zhaowei Wang, Shenzhen (CN); Haitian Peng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 159 days.

(21) Appl. No.: 16/353,644

(22) Filed: Mar. 14, 2019

(65) Prior Publication Data
US 2019/0213262 A1    Jul. 11, 2019

Related U.S. Application Data

(63) Continuation of application No. PCT/CN2017/115545, filed on Dec. 12, 2017.

(30) Foreign Application Priority Data

Dec. 12, 2016   (CN) .......................... 201611140621.5

(51) Int. Cl.
*G06F 40/56*    (2020.01)
*H04L 29/08*    (2006.01)
(Continued)

(52) U.S. Cl.
CPC .............. *G06F 40/56* (2020.01); *G06F 9/451* (2018.02); *G06F 9/453* (2018.02); *G06F 16/335* (2019.01);
(Continued)

(58) Field of Classification Search
CPC ......... H04L 51/00; H04L 51/02; G06F 8/425; G06F 16/3329; G06F 40/166; G06F 40/174
See application file for complete search history.

(56) References Cited

U.S. PATENT DOCUMENTS 7,284,189 B1 * 10/2007 Lawrence .............. G06Q 10/10
                                                    715/234
10,235,372 B1 *  3/2019 Kesarwani ............ G06F 16/148
(Continued)

FOREIGN PATENT DOCUMENTS

| CN | 1870732 A   | 11/2006 |
| CN | 104378282 A | 2/2015  |

(Continued)

OTHER PUBLICATIONS

International Search Report received for PCT Application No. PCT/CN2017/115545 dated Feb. 22, 2018 (with brief English translation), 15 pages.
(Continued)

*Primary Examiner* — Daniel Abebe
(74) *Attorney, Agent, or Firm* — Brinks Gilson & Lione

(57) ABSTRACT

The present disclosure relates to template data processing, template data requesting, and template data presenting methods and devices, and a storage medium. The method
(Continued)

---

Obtain a template subject and template key words matching the template subject — S210

Generate, according to the template key words, a template message matching the template subject, generate a template identifier corresponding to the template message, associate the template identifier and the corresponding template message, and store the template identifier and the corresponding template message into a template library, where the template message is delivered to a corresponding terminal according to a template delivery request that carries the template identifier and that is sent by a third-party server, the template delivery request is triggered by the third-party server according to a user page interaction behavior request, and the template identifier corresponds to the user page interaction behavior request — S220 includes obtaining a template subject and template key words matching the template subject and generating, according to the template key words, a first template message matching the template subject. The first template message includes the template key words. The method also includes generating a template identifier corresponding to the first template message and associating the template identifier with the corresponding first template message. The method further includes storing the template identifier and the corresponding first template message into a template library.

20 Claims, 19 Drawing Sheets

(51) Int. Cl.
*G06F 9/451* (2018.01)
*G06F 16/335* (2019.01)
*G06F 40/174* (2020.01)
*G06F 40/186* (2020.01)

(52) U.S. Cl.
CPC .......... *G06F 40/174* (2020.01); *G06F 40/186* (2020.01); *H04L 67/146* (2013.01); *H04L 67/26* (2013.01); *H04L 67/28* (2013.01); *H04L 67/32* (2013.01)

(56) References Cited

U.S. PATENT DOCUMENTS

| | | | |
|---|---|---|---|
| 2009/0198761 A1* | 8/2009 | Nanda | G06F 15/16 709/201 |
| 2011/0179346 A1* | 7/2011 | Dufour | G06F 16/9577 715/234 |
| 2012/0170571 A1* | 7/2012 | Antonelli | H04L 69/04 370/352 |
| 2013/0136253 A1 | 5/2013 | Liberman Ben-Ami et al. | |
| 2016/0087925 A1* | 3/2016 | Kalavagattu | H04L 43/10 709/206 |
| 2016/0301642 A1* | 10/2016 | Zou | H04L 67/42 |
| 2017/0295231 A1* | 10/2017 | Clemm | H04L 67/06 |
| 2018/0046984 A1* | 2/2018 | Brophy | G06F 8/38 |

FOREIGN PATENT DOCUMENTS

| | | |
|---|---|---|
| CN | 104378341 A | 2/2015 |
| CN | 105656979 A | 6/2016 |
| CN | 106534356 A | 3/2017 |

OTHER PUBLICATIONS

Chinese Office Action regarding CN 2016111406215 dated Aug. 16, 2017, with English concise translation, 7 pages.

Chinese Office Action regarding CN 2016111406215 dated Dec. 5, 2017, with English concise translation, 6 pages.

\* cited by examiner

METHODS AND DEVICES FOR PROCESSING TEMPLATE DATA, REQUESTING TEMPLATE DATA, AND PRESENTING TEMPLATE DATA

RELATED APPLICATION

This application claims priority to PCT Patent Application No. PCT/CN2017/115545, filed on Dec. 12, 2017, which claims priority to Chinese Patent Application No. 201611140621.5, filed with the Chinese Patent Office on Dec. 12, 2016, both of which are incorporated by reference in their entireties.

FIELD OF THE TECHNOLOGY

The present disclosure relates to the field of computer technologies, and in particular, to template data processing, template data requesting, and template data presenting methods and devices, and a storage medium.

BACKGROUND OF THE DISCLOSURE

With the development of computer technologies, various types of software applications provide various services for users. To improve quality of service, a message is pushed to a user, to implement information transmission, and increase feedback property of a service.

SUMMARY

To address the existing drawbacks in the field of processing template data and improve quality of service and efficiency, embodiments of this disclosure provide template data processing, template data requesting, and template data presenting methods and devices, and a storage medium.

The present disclosure describes a method for processing template data. The method includes obtaining, by a device, a template subject and template key words matching the template subject and generating, by the device according to the template key words, a first template message matching the template subject. The device includes a memory storing instructions and a processor in communication with the memory, and the first template message includes the template key words. The method also includes generating, by the device, a template identifier corresponding to the first template message and associating, by the device, the template identifier with the first template message. The method further includes storing, by the device, the template identifier and the first template message into a template library.

The present disclosure describes a device for processing template data. The device includes a memory storing instructions and a processor in communication with the memory. When the processor executes the instructions, the processor is configured to cause the device to obtain a template subject and template key words matching the template subject and generate, according to the template key words, a first template message matching the template subject. The first template message includes the template key words. When the processor executes the instructions, the processor is configured to cause the device to generate a template identifier corresponding to the first template message and associate the template identifier with the first template message. When the processor executes the instructions, the processor is configured to cause the device to store the template identifier and the first template message into a template library.

The present disclosure describes a method for requesting template data. The method includes receiving a user-interaction request forwarded by a server, and obtaining, according to the user-interaction request, corresponding user-interaction data and a template identifier that matches the user-interaction request; and triggering a template delivery request according to the user-interaction request, the template delivery request including the user-interaction data and the template identifier, and sending the template delivery request to the server.

The present disclosure describes a device for requesting template data. The device includes one or more memories; and one or more processors, the one or more memories storing one or more instruction modules, configured to be executed by the one or more processors; and the one or more instruction modules including: a receiving module, configured to receive a user-interaction request forwarded by a server, and obtain, according to the user-interaction request, corresponding user-interaction data and a template identifier that matches the user-interaction request; and a template delivery requesting module, configured to trigger a template delivery request according to the user-interaction request, the template delivery request including the user-interaction data and the template identifier, and send the template delivery request to the server.

The present disclosure describes a method for presenting template data The method includes obtaining a user interaction, and generating a corresponding user-interaction request according to the user interaction; sending the user-interaction request to a server; and receiving a second template message returned by the server, and generating a page used for presenting the second template message, the second template message being generated by the server according to a template delivery request sent by a third-party server, the template delivery request including user-interaction data and a template identifier, and the second template message being obtained by padding, by using the user-interaction data, a first template message corresponding to the template identifier.

The present disclosure describes a device for presenting template data The device includes one or more memories; and one or more processors, the one or more memories storing one or more instruction modules, configured to be executed by the one or more processors; and the one or more instruction modules including: a user-interaction request generation module, configured to obtain a user interaction, and generate a corresponding user-interaction request according to the user interaction; a sending module, configured to send the user-interaction request to a server; and a presenting module, configured to receive a second template message returned by the server, and generate a page used for presenting the second template message, the second template message being generated by the server according to a template delivery request sent by a third-party server, the template delivery request including user-interaction data and a template identifier, and the second template message being obtained by padding, by using the user-interaction data, a first template message corresponding to the template identifier.

The present disclosure describes a method for processing template data performed by a server. The method includes obtaining a template subject and template key words matching the template subject; generating, according to the template key words, a first template message matching the template subject, the first template message including the template key words; and generating a template identifier corresponding to the first template message, associating the template identifier with the corresponding first template message, and storing the template identifier and the corresponding first template message into a template library.

The present disclosure describes a method for requesting template data performed by a third-party server. The method includes receiving a user-interaction request forwarded by a server, and obtaining, according to the user-interaction request, corresponding user-interaction data and a template identifier that matches the user-interaction request; and triggering a template delivery request according to the user-interaction request, the template delivery request including the user-interaction data and the template identifier, and sending the template delivery request to the server.

The present disclosure describes a method for presenting template data performed by a terminal. The method includes obtaining a user interaction, and generating a corresponding user-interaction request according to the user interaction; sending the user-interaction request to a server; and receiving a second template message returned by the server, and generating a page used for presenting the second template message, the second template message being generated by the server according to a template delivery request sent by a third-party server, the template delivery request including user-interaction data and a template identifier, and the second template message being obtained by padding, by using the user-interaction data, a first template message corresponding to the template identifier.

The present disclosure describes a non-transitory computer readable storage medium. The non-transitory computer readable storage medium stores instructions. The instructions, when executed by a processor, cause the processor to obtain a template subject and template key words matching the template subject and generate, according to the template key words, a first template message matching the template subject. The first template message includes the template key words. The instructions, when executed by the processor, cause the processor to generate a template identifier corresponding to the first template message and associate the template identifier with the first template message. The instructions, when executed by the processor, cause the processor to store the template identifier and the first template message into a template library.

DETAILED DESCRIPTION OF THE DISCLOSURE

Figure 1:
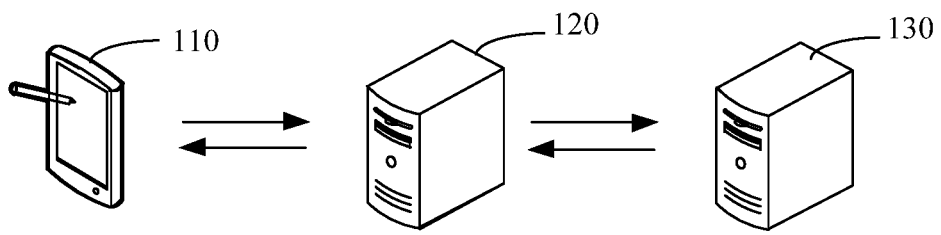
FIG. 1 is a diagram of an application environment of a template data processing method, a template data requesting method, and a template data presenting method according to an embodiment.

FIG. 1 is a diagram of an application environment of running a template data processing method, a template data requesting method, and a template data presenting method according to an embodiment. As shown in FIG. 1, the application environment includes a terminal 110, a server 120, and a third-party server 130. The terminal 110, the server 120, and the third-party server 130 communicate with each other by using a network, and the third-party server 130 may include multiple different third-party servers.

The terminal 110 may be a smartphone, a tablet computer, a notebook computer, a desktop computer, or the like, but this is not limited thereto. Different third-party server developers may upload self-defined templates, template messages, template information, and corresponding template identifiers to the server 120 by using the terminal, associate the templates, the template messages, and/or the template information with the template identifiers, and store the templates, the template messages, and/or the template information and the template identifiers into a template library of the server 120. Different third-party servers 130 may share the templates, the template messages, and/or the template information in the template library according to a template message delivery rule. If the terminal 110 obtains a user interaction, the terminal generates a corresponding user-interaction request and sends the user-interaction request to the server 120. The server 120 forwards the user-interaction request to the third-party server 130. The third-party server 130 obtains corresponding user-interaction data and a matched template identifier according to the user-interaction request, triggers, according to the user-interaction request, a template delivery request carrying the user-interaction data and the template identifier, and sends the template delivery request to the server 120, so that the server 120 obtains a corresponding template message according to the template identifier, pads the template message according to the user-interaction data to obtain template information, and sends template data carrying the template information to the terminal 110, and the terminal 110 presents the template information.

Figure 2:
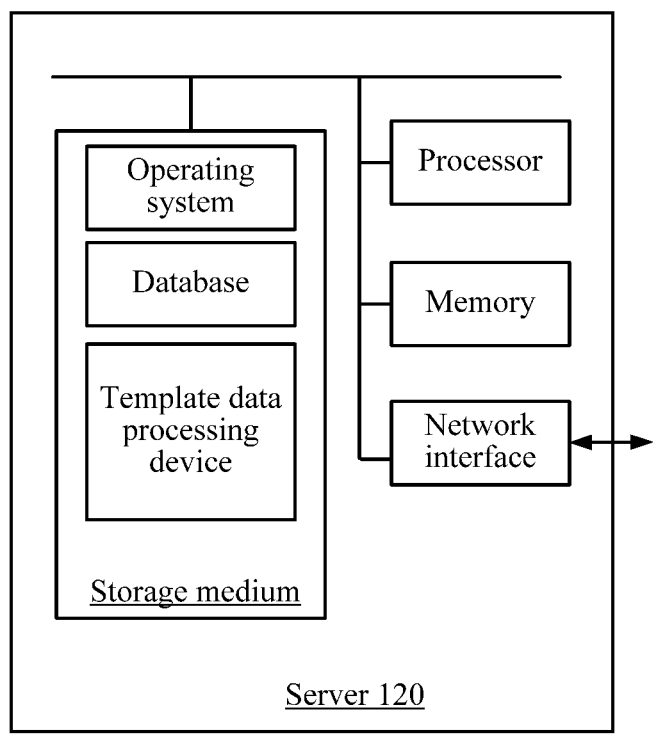
FIG. 2 is an internal structural diagram of a server in FIG. 1 according to an embodiment.
Figure 3:
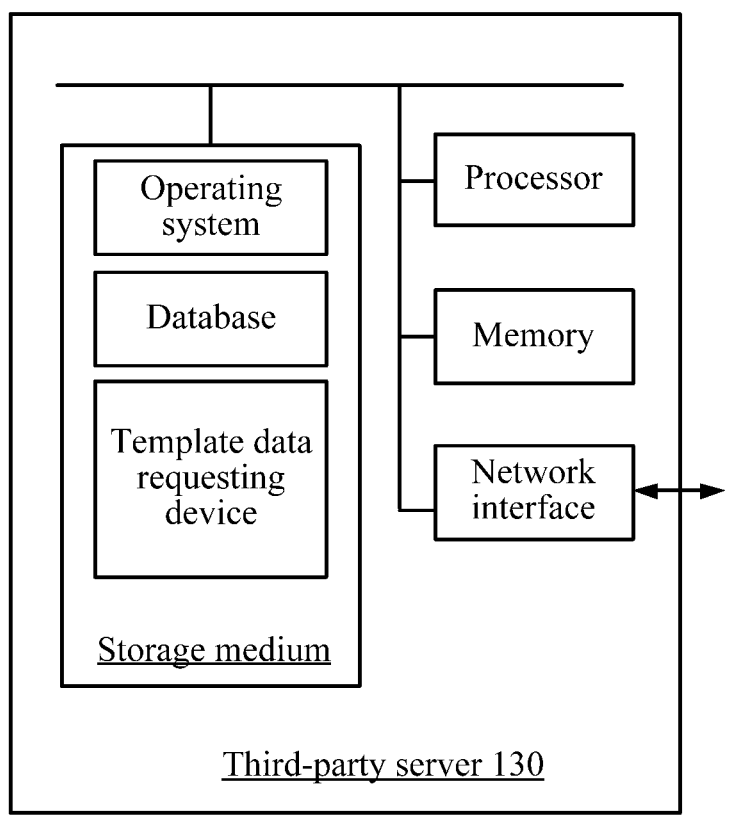
FIG. 3 is an internal structural diagram of a third-party server in FIG. 1 according to an embodiment.

In an embodiment, an internal structure of the server 120 in FIG. 1 is shown in FIG. 2. The server 120 includes a processor, a storage medium, a memory, and a network interface that are connected by using a system bus. The storage medium of the server 120 stores an operating system, a database, and a template data processing device. The database is configured to store data, for example, store a template identifier and a corresponding template message. The template data processing device is configured to implement a template data processing method applicable to the server 120. The processor of the server 120 is configured to provide a computing and control capability, and support running of the entire server 120. The memory of the server 120 provides a running environment for the template data processing device in the storage medium. The network interface of the server 120 is configured to communicate with the external terminal 110 and the third-party server 130 by using a network, for example, receive requests sent by the terminal 110 and the third-party server 130 and return template data to the terminal 110.

In an embodiment, an internal structure of the third-party server 130 in FIG. 1 is shown in FIG. 2. The third-party server 130 includes a processor, a storage medium, a memory, and a network interface that are connected by using a system bus. The storage medium of the third-party server 130 stores an operating system, a database, and a template data requesting device. The database is configured to store data, for example, store a correspondence between a user interaction and a template identifier. The template data requesting device is configured to implement a template data requesting method applicable to the third-party server 130. The processor of the third-party server 130 is configured to provide a computing and control capability, and support running of the entire third-party server 130. The memory of the third-party server 130 provides a running environment for the template data requesting device in the storage medium. The network interface of the third-party server 130 is configured to connect to and communicate with the external server 120 by using a network, for example, receive a request forwarded by the server 120.

Figure 4:
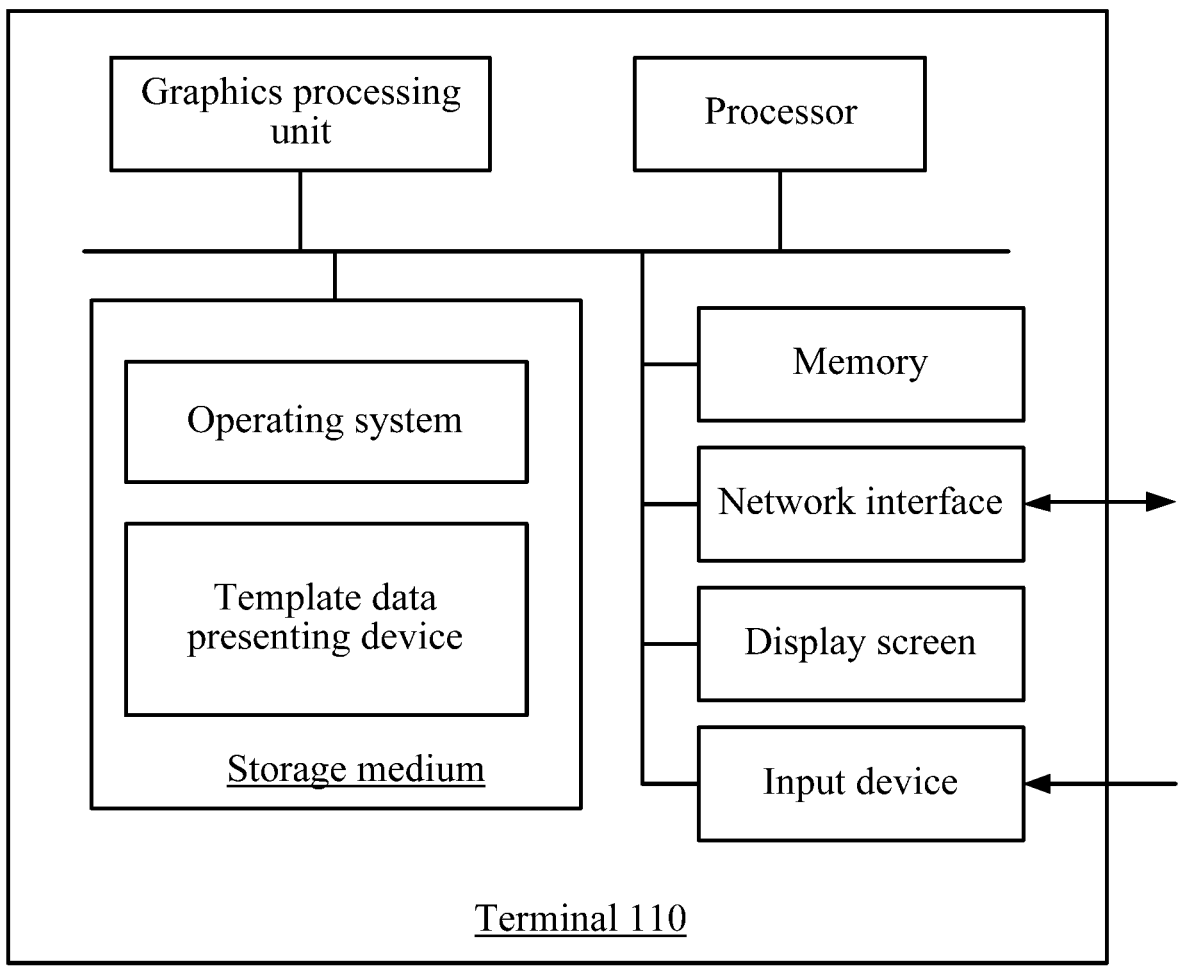
FIG. 4 is an internal structural diagram of a terminal in FIG. 1 according to an embodiment.

In an embodiment, an internal structure of the terminal 110 in FIG. 1 is shown in FIG. 4. The terminal 110 includes a processor, a graphics processing unit, a storage medium, a memory, a network interface, a display screen, and an input device that are connected by using a system bus. The storage medium of the terminal 110 stores an operating system, and further includes a template data presenting device. The device is configured to implement a template data presenting method applicable to the terminal. The processor is configured to provide a computing and control capability, and support running of the entire terminal 110. The graphics processing unit of the terminal 110 is configured to provide at least a drawing capability of a display interface. The memory provides a running environment for the template data presenting device in the storage medium. The network interface is configured to communicate with the server 120 by using a network, for example, send a user-interaction request to the server 120. The display screen is configured to display an application interface and the like, and the input device is configured to receive a command, data, or the like entered by a user. For a terminal 110 with a touch screen, the display screen and the input device may be touch screens.

In various embodiments of the present disclosure, a template message is a first template message and template information is a second template message.

Figure 5:
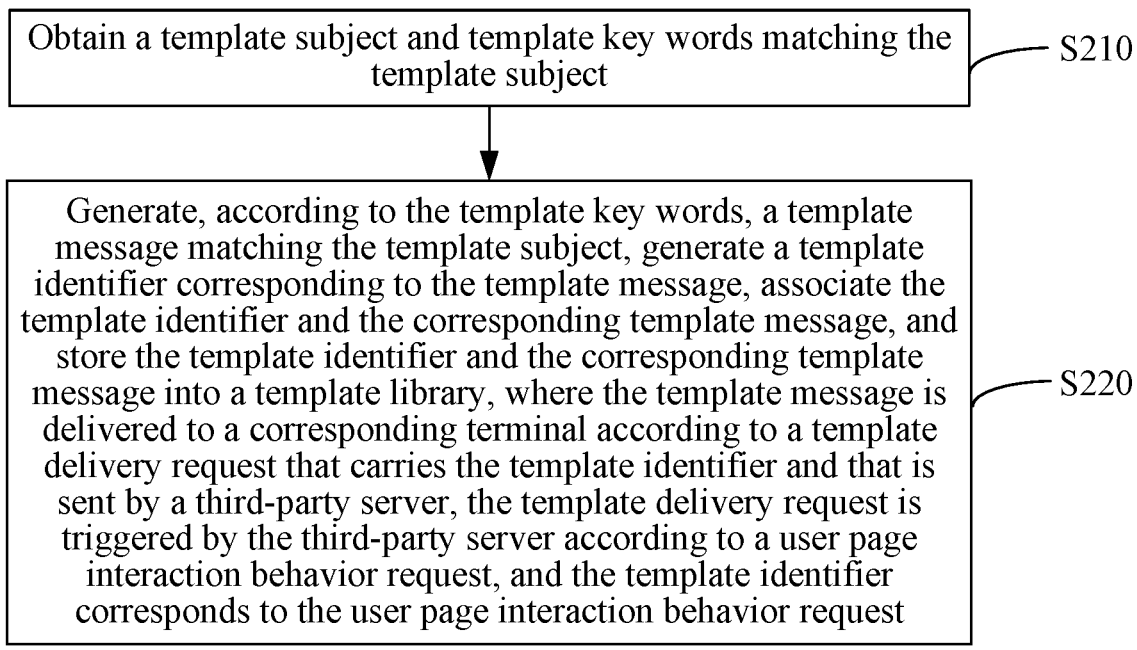
FIG. 5 is a flowchart of a template data processing method according to an embodiment.

As shown in FIG. 5, an embodiment provides a template data processing method. The method is described by using an example in which the method is applied to the server in the foregoing application environment. The method includes the following steps:

Step S210. Obtain a template subject and template key words matching the template subject.

Figure 8:
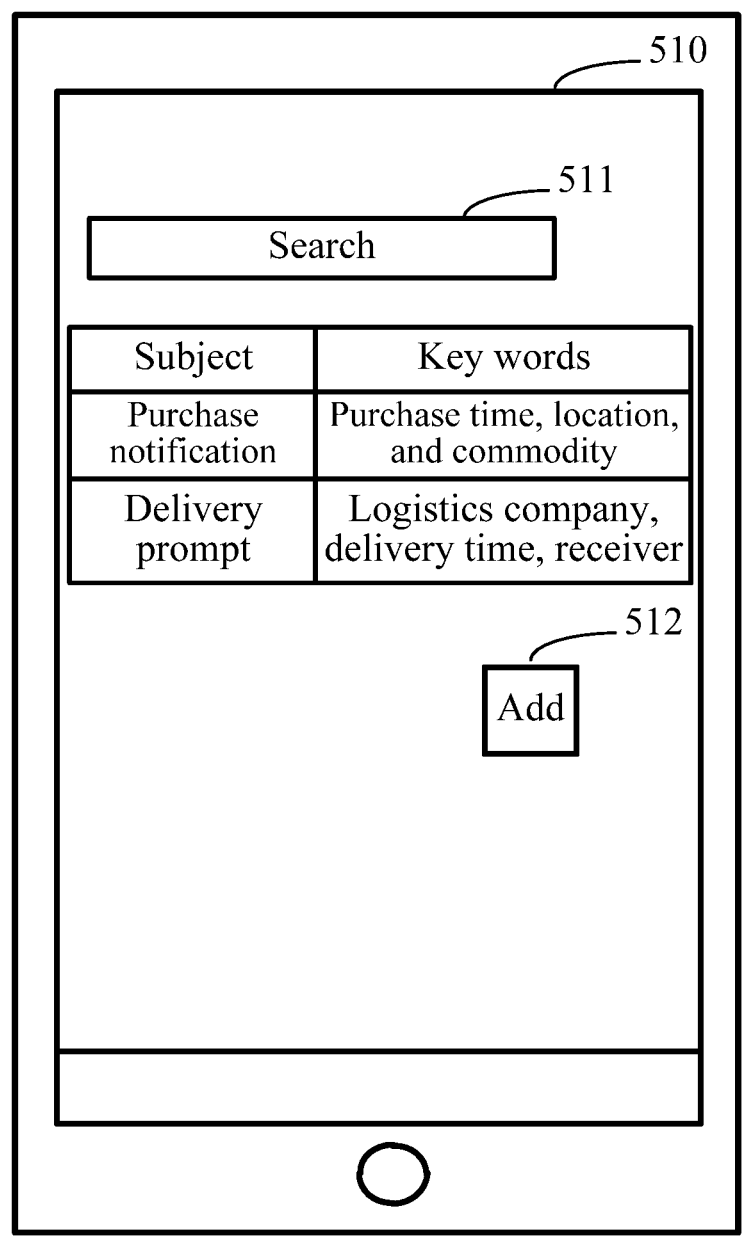
FIG. 8 is a schematic diagram of a template subject determining page according to an embodiment.

Specifically, a template is a structure in which there are particular format and content limitations and some content may be fixed and standardized in a self-defined manner according to needs. Different template subjects may correspond to different formats, and different template messages corresponding to a template subject may be formed by selecting and combining template key words. The template subject is used to describe a subject of a template message, the template subject may correspond to specific steps of providing a service, and a template subject may be added according to needs. As shown in the figure, in a specific embodiment, a template library includes templates having different template subjects, and the template subjects include purchase notification, delivery prompt, transaction prompt, and the like. A template key word is a basic unit forming a template message. In other words, a first template message includes template key words. Different template subjects correspond to different template key word sets. As shown in FIG. 8, template key words corresponding to the template subject "purchase notification" include a purchase location, a purchase time, and a commodity name.

In an embodiment, a subject key word sent by a terminal is obtained, and the template library is searched for an existing candidate template subject by using the subject key word. Existing template key words corresponding to the template subject may be obtained by using the candidate template subject, or newly added template key words that match the candidate template subject and that are sent by the terminal may be received, to form a new correspondence between the template subject and the template key words. The template library may correspond to a third-party service user identifier. Different third-party service providers have corresponding template libraries and each template library is invisible to the other service users. Alternatively, different third-party service users may share the template library, and the template library is a common template library, thereby improving template utilization, and reducing storage space usage of templates.

Step S220. Generate, according to the template key words, a template message matching the template subject, generate a template identifier corresponding to the template message, associate the template identifier and the corresponding template message, and store the template identifier and the corresponding template message into a template library, where the template message is delivered to a corresponding terminal according to a template delivery request that carries the template identifier and that is sent by a third-party server, the template delivery request is triggered by the third-party server according to a user-interaction request, and the template identifier corresponds to the user-interaction request.

Step 220 may further be described as "generate, according to the template key words, a first template message matching the template subject, where the first template message includes the template key words; and generate a template identifier corresponding to the first template message, associate the template identifier with the corresponding first template message, and store the template identifier and the corresponding first template message into the template library". The first template message is the template message.

It may be understood that that "the template message is delivered to a corresponding terminal according to a template delivery request that carries the template identifier and that is sent by a third-party server, the template delivery request is triggered by the third-party server according to a user-interaction request, and the template identifier corresponds to the user-interaction request" in step 220 actually may be understood as: The first template message may be used to generate a second template message according to the template delivery request that carries the template identifier and user-interaction data and that is sent by the third-party server, and the second template message is obtained by the server by padding the first template message corresponding to the template identifier in the template delivery request by using the user-interaction data. The template delivery request is triggered by the third-party server according to the user-interaction request, and the template identifier in the template delivery request corresponds to the user-interaction request.

Specifically, provided that each third-party service user selects template key words or creates new needed template key words, stipulates a sequence of the template key words, and sends the template key words to the server, the server can generate, according to the template key words, a template message matching the template subject, and the third-party service users themselves do not need to implement template messages through research and development, thereby improving the template message generation efficiency. Each template message has a corresponding template identifier, and the template identifier and the corresponding template message are associated and stored, so that the corresponding template message can be invoked from the template library by using the template identifier.

For the user-interaction request, when interacting with the third-party server, the terminal forms a user interaction by using an operation acting on a page corresponding to a third-party service and displayed by the terminal, and the terminal generates the user-interaction request according to the user interaction, and forwards the user-interaction request to the third-party server by using the server. The user interaction includes a form submission behavior, a payment behavior, a subscription behavior, and the like, and is initiated by a user. After receiving the user-interaction request, the third-party server may trigger a template delivery request according to a preset rule and send the template delivery request to the server. The template delivery request carries the template identifier corresponding to the user-interaction request. For example, the corresponding template subject is determined according to the user-interaction request, and the corresponding template identifier is obtained according to the template subject, or a correspondence between user interactions and template identifiers is pre-stored, and a corresponding template identifier is directly obtained according to the user interaction.

A time of triggering the template delivery request may be determined according to a time of the user-interaction request. For example, the template delivery request is triggered after the user-interaction request is received and the corresponding user interaction is completed, or the template delivery request is trigger within a preset time interval after the user-interaction request is received. A quantity of template delivery requests corresponding to each user-interaction request may be self-defined according to needs, and there may be an upper limit range. For example, sending of multiple template messages is triggered by one user interaction. Because the template delivery request can be triggered only by the user-interaction request, interference caused to users because each third-party server delivers a template message according to a self-defined rule is avoided. In addition, template messages are stored in the server, and are delivered by the server, so that the third-party server can implement uniform delivery and management on the corresponding template messages.

In this embodiment, the template subject and the template key words matching the template subject are obtained, the template message matching the template subject is generated according to the template key words, the template identifier corresponding to the template message is generated, and the template identifier and the corresponding template message are associated and stored into the template library. The template message is delivered to the corresponding terminal according to the template delivery request that carries the template identifier and that is sent by the third-party server, the template delivery request is triggered by the third-party server according to the user-interaction request, and the template identifier corresponds to the user-interaction request. Therefore, the corresponding template message can be flexibly generated by using the template subject and the template key words, and the third-party service users themselves do not need to implement template messages through research and development, thereby improving the template message generation efficiency and the convenience of template data delivery. In addition, the generated template messages can be delivered only by using the user-interaction requests, thereby avoiding the interference caused to the users because the third-party servers deliver template messages according to self-defined rules. Moreover, the template messages do not need to be stored into servers corresponding to respective third-party servers, and one server stores the template messages and delivers the template messages by receiving the template delivery requests sent by the third-party servers, so that uniform delivery and management are implemented on the template messages corresponding third-party services.

Figure 6:
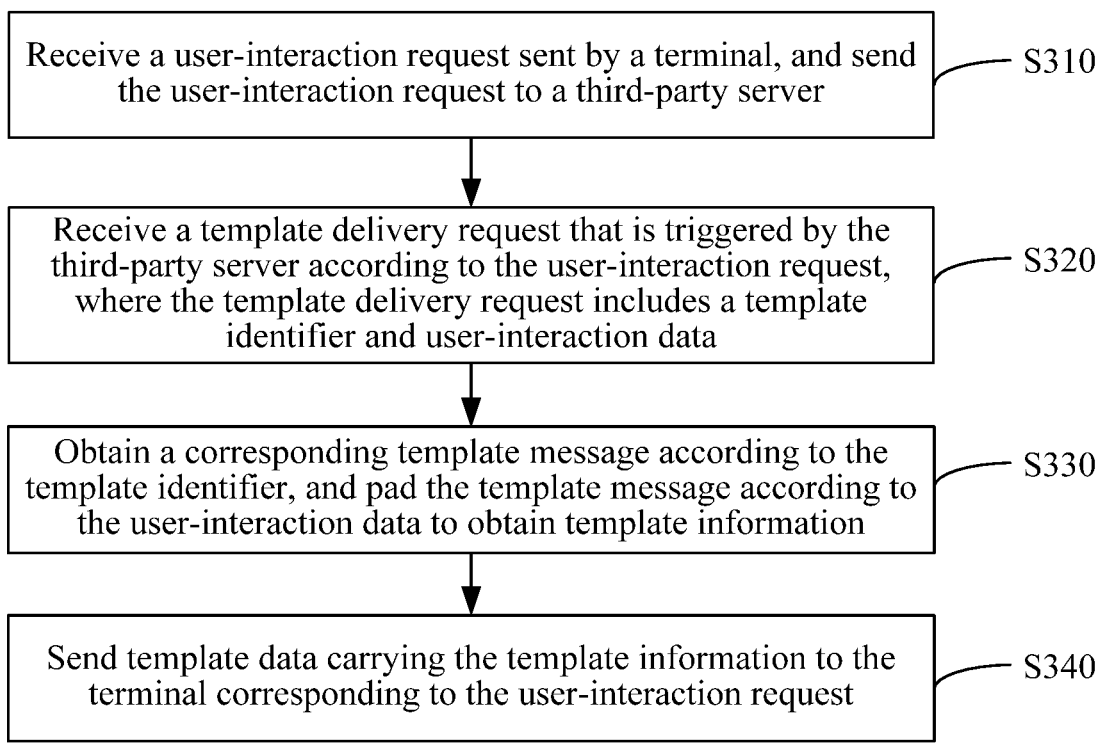
FIG. 6 is a flowchart of delivering template data according to an embodiment.

In an embodiment, as shown in FIG. 6, the method further includes:

Step S310. Receive a user-interaction request sent by a terminal, and send the user-interaction request to a third-party server.

Specifically, when needing to interact with the third-party server, the terminal generates the user-interaction request by using an operation acting on a page corresponding to a third-party service and displayed by the terminal, and a server forwards the user-interaction request to the third-party server.

Step S320. Receive a template delivery request that is triggered by the third-party server according to the user-interaction request, where the template delivery request includes a template identifier and user-interaction data.

Specifically, the third-party server receives the user-interaction request, and triggers the template delivery request according to a preset rule. The preset rule may be self-defined according to needs, for example, it is self-defined whether a template delivery request needs to be triggered for a user interaction corresponding to a current user-interaction request, and a time of triggering a template delivery request, a quantity of triggered template delivery requests, and a triggering condition are self-defined, for example, the template delivery request needs to be triggered when a response to the user interaction corresponding to the user-interaction request is completed. The user-interaction data is interaction data corresponding to the user-interaction request. The corresponding interaction data may be extracted from the user-interaction request, or the corresponding interaction data may be extracted from a response result of the user-interaction request. For example, for a user-interaction request of hotel booking, interaction data extracted from the user-interaction request includes a booking time, a user booking the hotel, a hotel name, and the like, and interaction data extracted from a response result includes whether the booking succeeds, information about the booked room, and the like.

Step S330. Obtain a corresponding template message according to the template identifier, and pad the template message according to the user-interaction data to obtain template information. In other words, a corresponding first template message is obtained according to the template identifier in the template delivery request, and the obtained corresponding first template message is padded according to the user-interaction data in the template delivery request, to obtain a second template message.

Specifically, the corresponding template message is obtained according to the template identifier, and a corresponding key word is padded with specific content corresponding to the user-interaction data, to obtain the template information including the specific content. The user-interaction data is data generated in real time according to an interaction behavior, so that the template information corresponds to different real-time information as the user-interaction data is different, to give dynamic real-time feedback to a user behavior.

Step S340. Send template data carrying the template information to the terminal corresponding to the user-interaction request. In other words, the second template message is sent to the terminal corresponding to the user-interaction request.

Specifically, the user-interaction request may carry a user identifier or a terminal identifier, so that the corresponding terminal is determined according to the user identifier or the terminal identifier. In addition to the template information, the template data may further include presentation parameter information, for example, presentation parameters of key words corresponding to the template information, including location information, a font color, an animation state parameter, a scaling parameter, and the like, so that the terminal generates a corresponding template information presenting page according to the presentation parameter information.

In an embodiment, the method further includes: receiving an analog user-interaction request sent by a second terminal, sending the analog user-interaction request to the third-party server, receiving a template delivery request that is triggered by the third-party server according to the analog user-interaction request, where the template delivery request includes a template identifier and user-interaction data, simulating, according to the template delivery request, delivery of template data carrying template information, and sending a response corresponding to the template delivery request to the second terminal.

Specifically, the second terminal is a test terminal. The second terminal may generate the analog user-interaction request according to a test script. The third-party server obtains the template identifier and the user-interaction data according to the analog user-interaction request, triggers the template delivery request, sends the template delivery request to the server to generate template data, and obtains, according to a generation result, a response corresponding to the template delivery request, for example, generation of the template data succeeds or fails. The response may carry response data in a preset format. For example, when the template data is normally generated, returned response data is a JSON data packet, for example:

```
{
    "errcode": 0,
    "errmsg": "ok",
}
```

Error code information is returned when an error occurs in generation of the template data, and descriptions are as follows:

returned code descriptions 40037 the template identifier template_id is incorrect 41028 the form identifier form_id is incorrect or is overdue 41029 the form identifier form_id is used 41030 the jump page page is incorrect In this embodiment, the terminal generates and sends the analog user-interaction request, and triggers the template delivery request to test whether the template data can be normally generated, so that a test developer can locate an error reason by using error information, and fix the problem.

Figure 7:
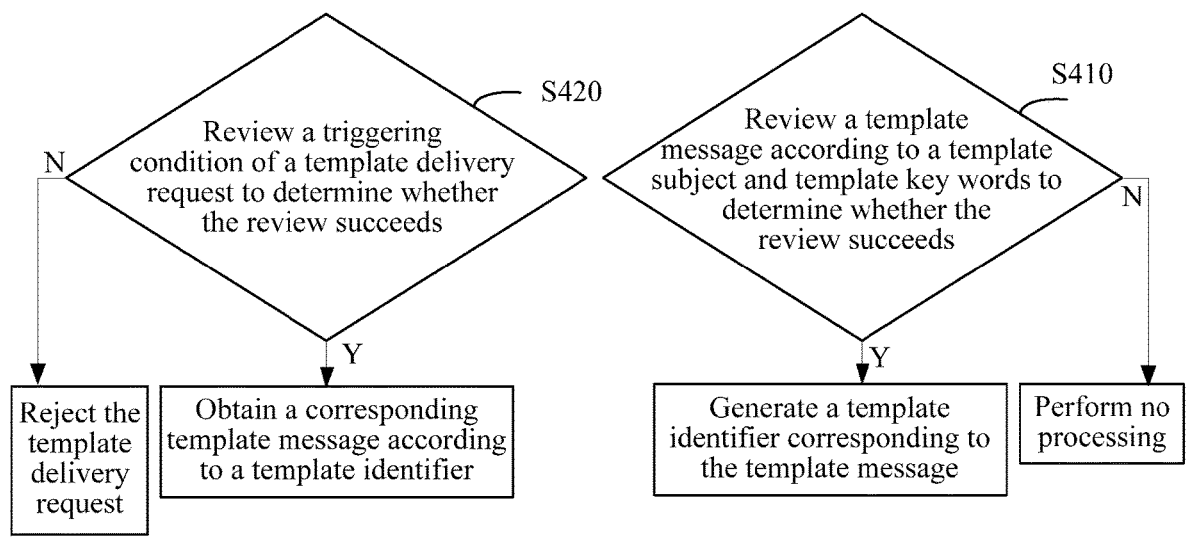
FIG. 7 is a flowchart of generating a template message according to a review result and delivering the template message according to an embodiment.

In an embodiment, as shown in FIG. 7, the method further includes:

Step S410. Review a template message according to a template subject and template key words, and if the review succeeds, perform the step of generating a template identifier corresponding to the template message, or otherwise, perform no processing.

Specifically, a review condition may be self-defined according to needs. For example, review conditions include: template subjects in a template library corresponding to a same third-party user cannot be the same, a content similarity of template subjects is less than a preset threshold, a template subject ends with preset content, special symbols are avoided in a template subject, preset content is excluded from a template subject, template key words corresponding to a same template subject are different, a similarity of template key words corresponding to a same template subject is less than a preset threshold, a content broadness degree of the template key word is less than a preset threshold, and the like. The step of generating the template identifier corresponding to the template message is performed only for a template message passing the review, and the template message is stored into the template library, or otherwise, no processing is performed. Template information is reviewed, so that the template information is controlled, and it is avoided that the third-party server generates a large amount of harassment or marketing template information. A server forms a monitoring platform for various third-party servers, thereby improving quality of third-party services.

Step S420 include to review a triggering condition of a template delivery request, and if the review succeeds, perform the step of obtaining the corresponding template message according to the template identifier, or otherwise, reject the template delivery request.

Specifically, if a quantity of template delivery requests within a preset time period exceeds a preset threshold, it may be determined as malicious triggering, and the review on the triggering condition fails. Alternatively, it may be determined, by using related information of the triggering condition such as a triggering location and a triggering form of the triggering condition, whether the review on the triggering condition succeeds. The related information of the triggering condition may be detected by the terminal, and then added to a user-interaction request, to be forwarded to the server, so that the server reviews the triggering condition according to the related information of the triggering condition. For example, if detecting that there is information or an operation key that maliciously induces a user to perform a triggering operation, the terminal generates the related information of the corresponding triggering condition. The triggering condition is reviewed, so that a maliciously triggered template delivery request can be filtered out, thereby controlling template information delivery. For example, in a specific embodiment, when a user completes a payment behavior or a form submission behavior, it may be allowed to push a limited quantity of template messages to the user within seven days.

In an embodiment, step S210 includes: searching for a matched target template subject according to a subject key word, and if the target template subject does not exist, adding a template subject corresponding to the subject key word.

Specifically, a subject key word that is input by the terminal by using a search box on an interface is received. The server searches the template library for the target template subjects matching the subject key word, where there may be multiple target template subjects, returns the target template subjects to the terminal, receives selection performed by the terminal on the target template subjects, and determines a final target template subject. If the terminal does not select the target template subject, the terminal may adds a new template subject by using an adding key. The server receives the newly-added template subject sent by the terminal, and adds the newly-added template subject to the template library. As shown in FIG. 8, in a specific embodiment, the terminal displays a template subject determining page 510 including a search box. A target template subject matching a subject key word may be input on the search box 511, and if the target template subject does not satisfy a condition, a new template subject may be added by using the adding key 512.

In an embodiment, step S210 includes: obtaining candidate template key words matching the template subject, and screening the candidate template key words to obtain target template key words matching the template subject.

Figure 9:
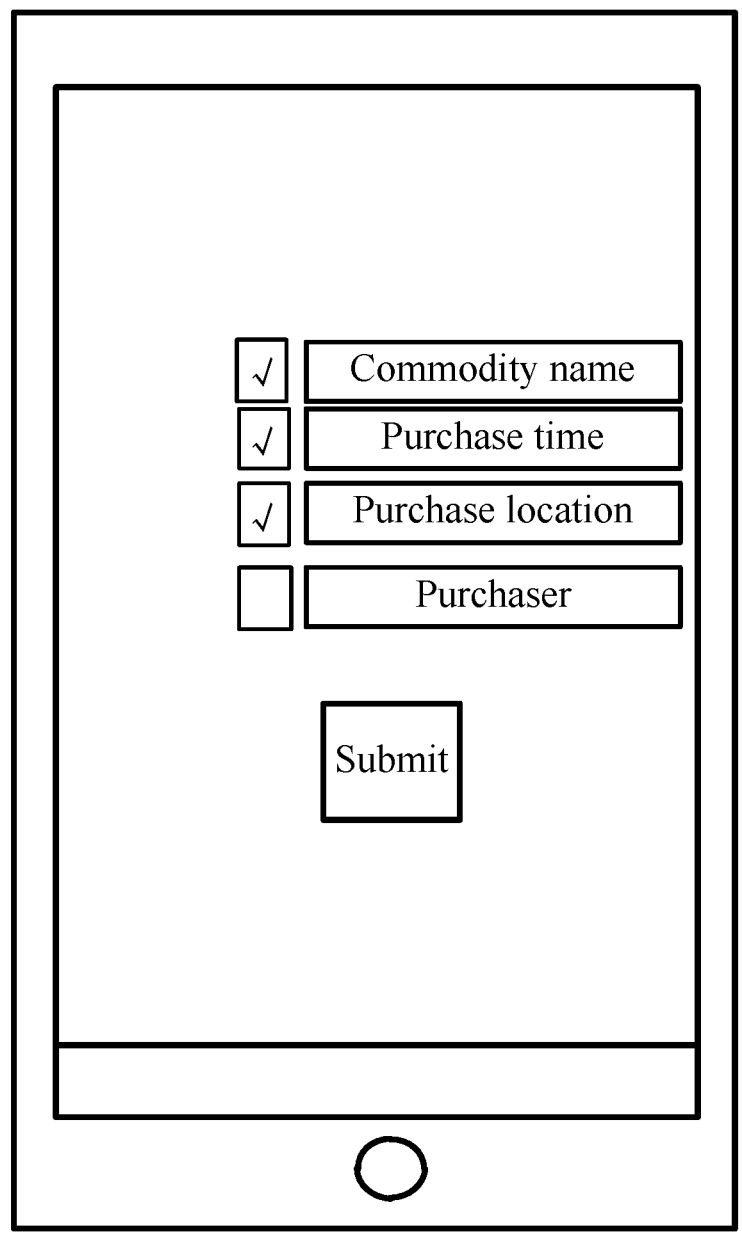
FIG. 9 is a schematic diagram of a template key word determining page according to an embodiment.

Specifically, the matched candidate template key words are obtained according to the template subject, and the candidate template key words are preset key words related to the template subject. The candidate template key words are sent to the terminal for presentation, an operation acting on the candidate template key words is received, and the candidate template key words are screened to obtain the target template key words. The target template key words matching the template subject may be flexibly configured, and target template key words can be configured for different third-party service or different interaction behaviors according to service content, so that the flexibility is high, and a matching degree is high. As shown in FIG. 9, in a specific embodiment, FIG. 9 is a schematic diagram of selecting candidate template key words to obtain target template key words.

In an embodiment, step S210 includes: searching for target template key words matching the template subject, and if the target template key words do not exist, adding template key words corresponding to the template subject.

Specifically, the server may receive a key word search word matching the template subject and sent by the terminal, to search the template library for corresponding target template key words according to the key word search word, and if no target template key word is found, the server may send new template key words from the terminal by using an adding key, add the new template key words to the template library and store the template key words in correspondence to the template subject, to obtain the template key words corresponding to the template subject. Template key word is added to configure a template message, thereby further improving the configuration flexibility.

In an embodiment, the user interaction includes at least one of a form submission behavior and a resource value transfer behavior.

Specifically, the form submission behavior is a behavior that the terminal collects user input by using a form, and submits the input form content to the server. The user-interaction request is generated by using the form submission behavior, the template delivery request may be triggered according to the user-interaction request, and presentation including important form content and/or response data corresponding to a form behavior is generated, thereby improving feedback property of the service, helping the user to acknowledge the form content and obtain a form submission response result, and improving the quality of service. The resource transfer behavior is a behavior of transferring resource values between different accounts, for example, a payment behavior. A resource value is sensitive information. The template delivery request is triggered by using the resource value transfer behavior, so that specific transfer information of a resource value can be presented in real time, and security of a user resource is improved. Different form submission behaviors are recognized by using form identifiers, different resource value transfer behaviors are recognized by using a resource value transfer identifier, and corresponding template identifiers are obtained by using different form identifiers or resource value transfer identifiers, to obtain corresponding template messages.

In an embodiment, a page corresponding to the user interaction is a page of a child application of a parent application running on an operating system.

Specifically, the child application is an application program attached to the parent application for running, and the child application may be downloaded, started, run, and closed by using the parent application. The parent application may be a social application, a dedicated application dedicated for supporting the child application, a file management application, a mail application, a game application, or the like. The social application includes an instant messaging application, a social network service (SNS) application, a live broadcast application, or the like. The child application is an application implemented in an environment provided by the parent application. The child application may be specifically a social application, a file management application, a mail application, a game application, or the like. The user interaction may be performed on a page of each child application, to generate the user-interaction request. Different child applications correspond to different child application identifiers, delivery of a template message corresponding to a corresponding child application identifier may be triggered according to the user-interaction request, or different child applications may share a template message.

Figure 10:
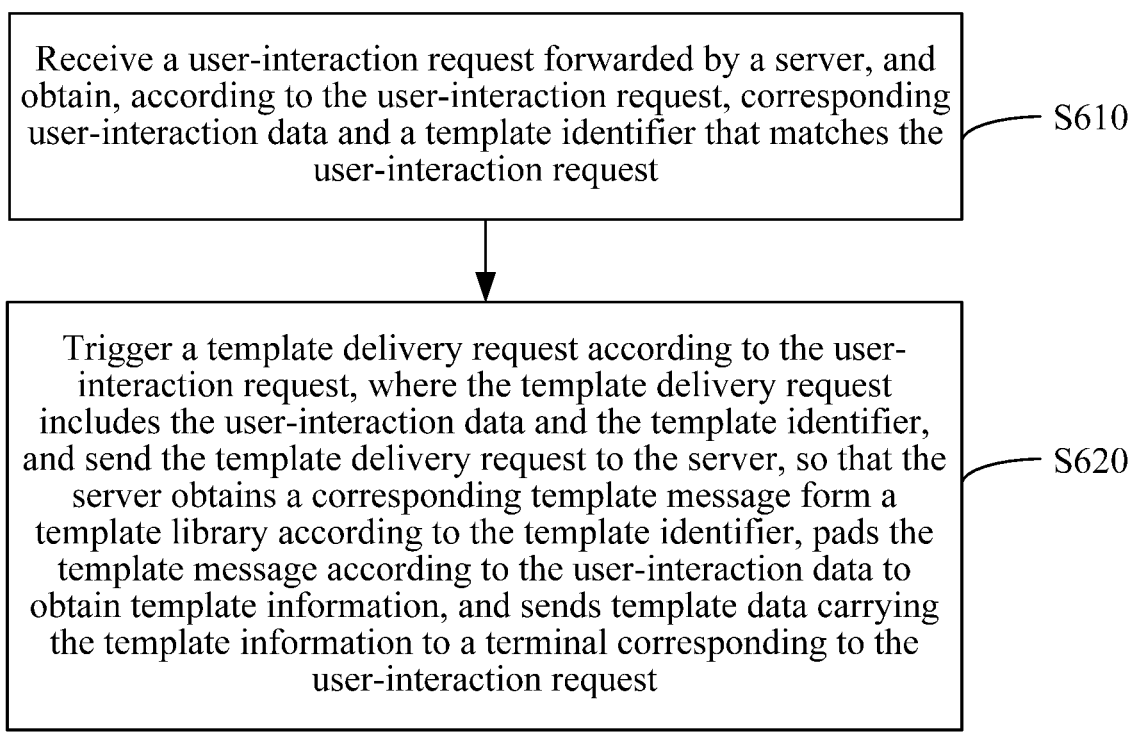
FIG. 10 is a flowchart of a template data requesting method according to an embodiment.

As shown in FIG. 10, an embodiment provides a template data requesting method. The method is described by using an example in which the method is applied to the third-party server in the foregoing application environment. The method includes the following steps:

Step S610. Receive a user-interaction request forwarded by a server, and obtain, according to the user-interaction request, corresponding user-interaction data and a template identifier that matches the user-interaction request.

Specifically, for the user-interaction request, when interacting with the third-party server, a terminal forms a user interaction by using an operation acting on a page corresponding to a third-party service and displayed by the terminal, and the terminal generates the user-interaction request according to the user interaction, and forwards the user-interaction request to the third-party server by using the server. The user interaction includes a form submission behavior, a payment behavior, a subscription behavior, and the like, and is initiated by a user. The third-party server receives the user-interaction request, and obtains, according to the user-interaction request, the corresponding user-interaction data and the template identifier that matches the user-interaction request.

The user-interaction data is interaction data corresponding to the user-interaction request. Corresponding interaction data may be extracted from the user-interaction request, or interaction data may be extracted from a response result corresponding to the user-interaction request. A corresponding template subject may be determined according to the user-interaction request, the corresponding template identifier is obtained according to the template subject. Alternatively, a correspondence between user interactions and template identifiers is pre-stored, and the corresponding template identifier is directly obtained according to the user interaction.

Step S620. Trigger a template delivery request according to the user-interaction request, where the template delivery request includes the user-interaction data and the template identifier, and send the template delivery request to the server, so that the server obtains a corresponding template message form a template library according to the template identifier, pads the template message according to the user-interaction data to obtain template information, and sends template data carrying the template information to a terminal corresponding to the user-interaction request.

Specifically, the template delivery request is triggered by using a preset rule according to the user-interaction request. The preset rule may be self-defined according to needs, for example, it is self-defined whether a template delivery request needs to be triggered for a user interaction corresponding to a current user-interaction request, and a time of triggering a template delivery request, a quantity of triggered template delivery requests, and a triggering condition are self-defined, for example, the template delivery request needs to be triggered when a response to the user interaction corresponding to the user-interaction request is completed. The template delivery request may be sent to the server in an HTTP request manner by using an interface address. The template delivery request may be sent by using a POST method. The template delivery request carries a POST parameter, and the POST parameter includes the user-interaction data and the template identifier. The user-interaction data is data generated in real time according to an interaction behavior, so that the template information corresponds to different real-time information as the user-interaction data is different, to give dynamic real-time feedback to a user behavior. In a specific embodiment, the POST parameter includes the following content:

touser: a user identifier of a receiver, template_id: a template identifier of a template message needing to be delivered, page: click the template to check details of a jump page, and if nothing is filled, the template includes no jumping operation, form_id: for a form submission behavior, it is a form identifier carried in a submitted event; for a resource value transfer behavior, it is a resource transfer identifier of current resource value transfer, value: it is template content generated according to the user-interaction data, and if nothing is filled, a blank template is delivered, color: it indicates a font color of the template content, and if nothing is filled, the color is black by default, and emphasis_keyword: it indicates a key word needing to be amplified in the template, and if nothing is filled, no word needs to be amplified by default.

In a specific embodiment, the template delivery request includes the following POST parameters:

```
{
    "touser": "OPENID",
    "template_id": "TEMPLATE_ID",
    "page": "index",
    "form_id": "FORMID",
    "data": {
        "keyword1": {
            "value": "339208499",
            "color": "#173177"
        },
        "keyword2": {
            "value": "12:30, January 5, 2015",
            "color": "#173177"
        },
        "keyword3": {
            "value": "Yuehai Sheraton Hotel",
            "color": "#173177"
        },
        "keyword4": {
            "value": "208 Tianhe road, Tianhe district, Guangzhou",
            "color": "#173177"
        }
    },
    "emphasis_keyword": "keyword1.DATA"
}
```

Figure 11:
FIG. 11 is a schematic diagram of a template information presenting interface according to an embodiment.

The server receives the template delivery request sent by the third-party server. The server obtains the corresponding template message from the template library according to the template identifier, pads the template message according to the user-interaction data to obtain the template information, and sends the template data carrying the template information to the terminal corresponding to the user-interaction request. In the foregoing specific embodiment, keyword1, keyword2, keyword3, and keyword4 in the POST parameters respectively correspond to template key words, an order number, an order time, a name of a booked hotel, and an address of the booked hotel, in the template message, so that the template key words are padded with the specific content in the POST parameters, to obtain the template information. A presentation parameter in the POST parameters and the template information are added to the template data and the template data is sent to the terminal. The terminal generates, according to the presentation parameter in the template data, a page of a presentation state corresponding to the presentation parameter, and presents the template information on the page. The finally generated template information presenting page is shown in FIG. 11.

In this embodiment, the user-interaction request forwarded by the server is received, the corresponding user-interaction data and the template identifier that matches the user-interaction request are obtained according to the user-interaction request, the template delivery request is triggered according to the user-interaction request, where the template delivery request includes the user-interaction data and the template identifier, and the template delivery request is sent to the server, so that the server obtains the corresponding template message from the template library according to the template identifier, pads the template message according to the user-interaction data to obtain the template information, and sends the template data carrying the template information to the terminal corresponding to the user-interaction request. The third-party service users themselves do not need to implement template messages through research and development, and the server obtains the corresponding template message from the template library according to the template identifier, thereby improving the template message generation efficiency and the convenience of template data delivery. In addition, delivery of the generated template message can be triggered only by using the user-interaction request, thereby avoiding interference caused to the user because the third-party servers deliver template messages by using self-defined rules. In addition, the template messages do not need to be stored in servers corresponding to third-party services, and the server stores the template messages and performs delivery by receiving the template delivery requests sent by the third-party servers, thereby implementing uniform delivery and management on the template messages corresponding to the third-party services.

Figure 12:
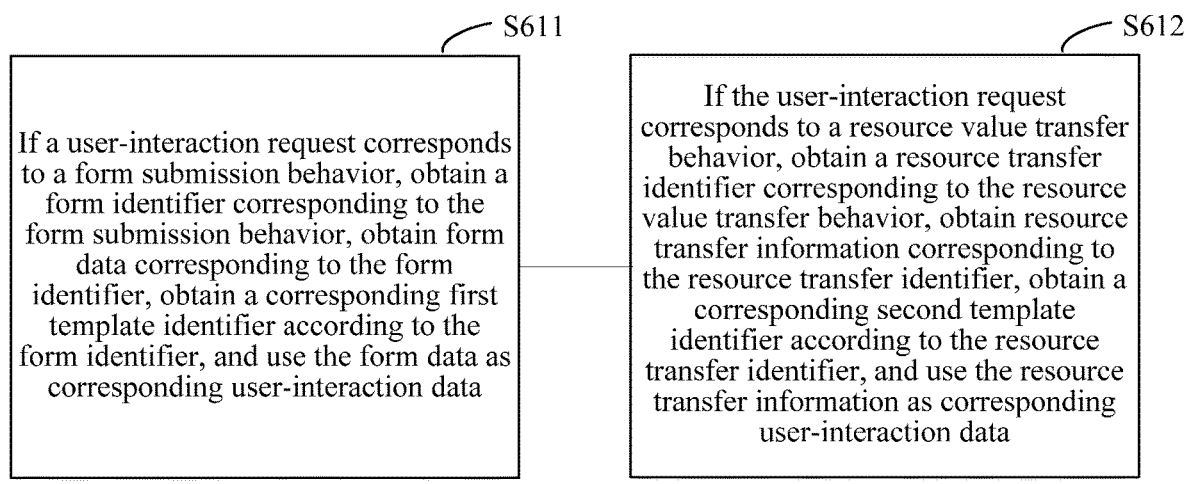
FIG. 12 is a flowchart of obtaining a template identifier according to an embodiment.

In an embodiment, as shown in FIG. 12, step S610 of obtaining, according to the user-interaction request, corresponding user-interaction data and a template identifier that matches the user-interaction request includes:

Step S611. If the user-interaction request corresponds to a form submission behavior, obtain a form identifier corresponding to the form submission behavior, obtain form data corresponding to the form identifier, obtain a corresponding first template identifier according to the form identifier (in other words, obtain the corresponding template identifier according to the form identifier), and use the form data as the corresponding user-interaction data.

Step S612. If the user-interaction request corresponds to a resource value transfer behavior, obtain a resource transfer identifier corresponding to the resource value transfer behavior, obtain resource transfer information corresponding to the resource transfer identifier, obtain a corresponding second template identifier according to the resource transfer identifier (in other words, obtain the corresponding template identifier according to the resource transfer identifier), and use the resource transfer information as the corresponding user-interaction data.

Specifically, the third-party server pre-stores an association relationship between user interaction identifiers and corresponding template identifiers. If the user interaction is a form submission behavior, an association relationship between a form identifier and a corresponding template identifier is pre-stored, and if the user interaction is a resource value transfer behavior, an association relationship between a resource transfer identifier and a corresponding template identifier is pre-stored, so that different behavior identifiers can be obtained according to different behaviors, and a corresponding template identifier is obtained according to an association relationship between a behavior identifier and a template identifier. Different user interactions correspond to different information. Form data is generated as user-interaction data for the form submission behavior, and resource transfer information is generated as user-interaction data for the resource value transfer behavior. The form data includes data submitted in a form and data generated after the third-party server makes a response according to submitted data after the form is submitted. The resource transfer information includes data carried in the resource transfer request and data that is obtained after the third-party server makes a response according to the resource transfer request.

In an embodiment, the method further includes: sending a certificate obtaining request to the server, where the certificate obtaining request includes a third-party user identifier and a corresponding third-party key, so that the server sends a corresponding interface invoking certificate according to the certificate obtaining request.

Specifically, the interface invoking certificate access_token is a globally unique interface invoking certificate, and is provided when an interface provided by the server is invoked, to verify interface invoking permission. A length and a valid time of the access_token may be self-defined. In a specific embodiment, space of at least 512 characters is reserved for storing the access_token, a valid time is 2 hours, refresh needs to be performed regularly, and after access_token is obtained, previously obtained access_token is invalid. The third-party server sends a certificate obtaining request carrying a third-party user identifier and a corresponding third-party key to the server, to obtain the interface invoking certificate. Alternatively, a dedicated server, for example, a central control server, may be disposed to dedicatedly generate an interface invoking certificate and respond to a certificate obtaining request. A server generating an interface invoking certificate may actively and regularly generate a new interface invoking certificate according to the valid time of the interface invoking certificate, and provides an interface for another third-party server to trigger an access_token refresh process when detecting that the access_token expires. The certificate obtaining request may be sent to the server in an HTTP request manner by using an interface address. For example, in a specific embodiment, the interface address is:

https://aaa.com/cgi-bin/token?grant_type=client_credential&appid=APPID&secret=APPSECRET The certificate obtaining request may be sent by using a GET method. The certificate obtaining request carries a GET parameter, and the GET parameter includes a third-party user identifier and a corresponding third-party key. In a specific embodiment, the GET parameter includes the following content:

grant_type: obtain access_token, and fill in client_credential, appid: third-party user identifier, secret: third-party key, namely, appsecret During normal obtaining, the server returns a JSON data packet to the third-party server, and the JSON data packet includes an interface invoking certificate access_token and a corresponding valid time. When abnormality occurs in the obtaining, the JSON data packet returned by the server may carry an error code. The third-party user identifier is a user identifier that is registered in the server under application of a third-party service provider. The third-party key corresponds to the third-party user identifier, and the third-party key may be updated in real time to ensure security.

Step S620 of sending the template delivery request to the server includes: sending the template delivery request carrying the interface invoking certificate to the server, so that the server verifies template delivery permission according to the interface invoking certificate.

Specifically, the template delivery request carries the interface invoking certificate. For example, in a specific embodiment, when the template delivery request is sent to the server in an HTTP request manner by using an interface address, the interface address is: https://aaa.com/cgi-bin/message/wxopen/template/send?access_token=ACCESS_TOKEN.

A value of access_token is an interface invoking certificate obtained from the server through application.

Only the interface invoking certificate passing the permission verification can be used to invoke the template delivery interface to complete template delivery. If the interface invoking certificate is invalid, the verification fails, there is no template delivery permission, and a template message cannot be delivered.

In this embodiment, the template message delivery permission is verified by using the interface invoking certificate, so that template message delivery can be effectively controlled, and a malicious template delivery request is avoided.

In an embodiment, a page corresponding to the user-interaction request is a page of a child application of a parent application running on an operating system.

Specifically, the child application is an application program attached to the parent application for running, and the child application may be downloaded, started, run, and closed by using the parent application. The parent application may be a social application, a dedicated application dedicated for supporting the child application, a file management application, a mail application, a game application, or the like. The social application includes an instant messaging application, an SNS application, a live broadcast application, or the like. The child application is an application implemented in an environment provided by the parent application. The child application may be specifically a social application, a file management application, a mail application, a game application, or the like. The user interaction may be performed on a page of each child application, to generate the user-interaction request. Different child applications correspond to different child application identifiers, delivery of a template message corresponding to a corresponding child application identifier may be triggered according to the user-interaction request, or different child applications may share a template message.

In an embodiment, template key words corresponding to the template message are generated according to a configuration policy, and the user-interaction data corresponds to the template key words.

Specifically, the template key words may be determined according to message content corresponding to a current service, the corresponding template key words may be configured according to the template subject, existing template key words corresponding to the template subject may be obtained by using a candidate template subject, or newly added template key words that match a candidate template subject and that are sent by the terminal may be received, to form a new correspondence between the template subject and the template key words. If target template key words matching the template subject do not exist, template key words corresponding to the template subject may be added. The template key words are configured by using the configuration policy, and the corresponding template message is generated by using the configured template key words, thereby improving the flexibility of the template message.

When the user-interaction data is obtained, the user-interaction data corresponding to the template key words needs to be obtained, so that the corresponding template key words are padded according to the user-interaction data, to generate template information dynamically changing with an interaction behavior.

Figure 13:
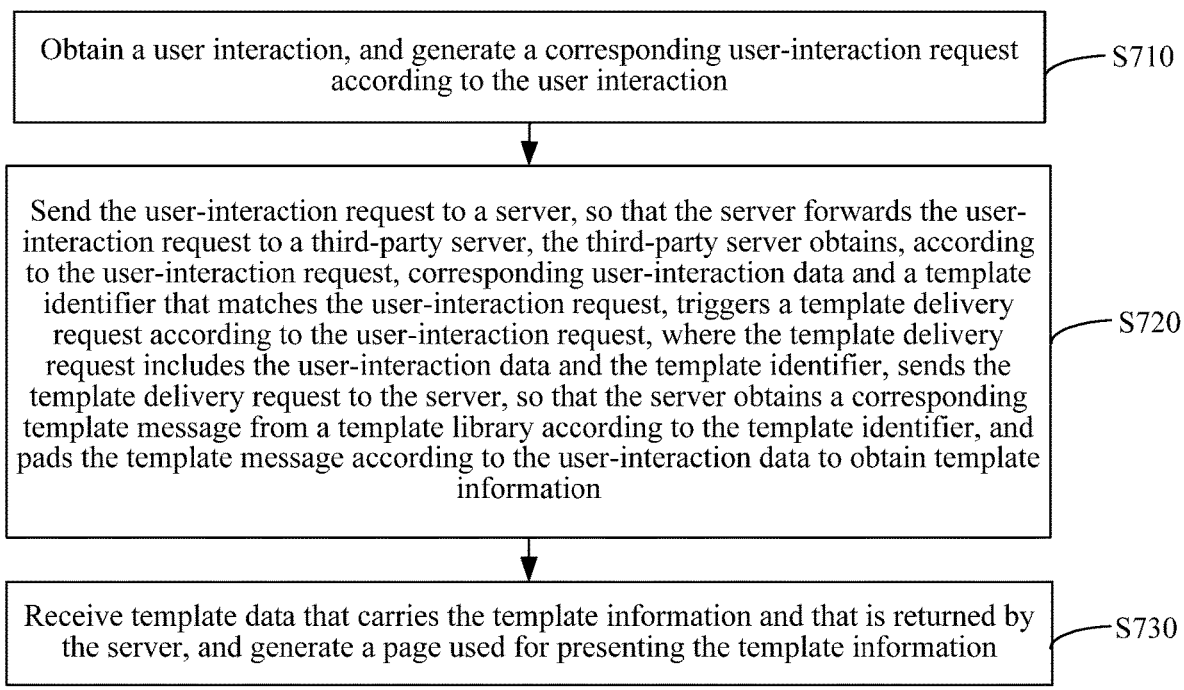
FIG. 13 is a flowchart of a template data presenting method according to an embodiment.
Figure 14:
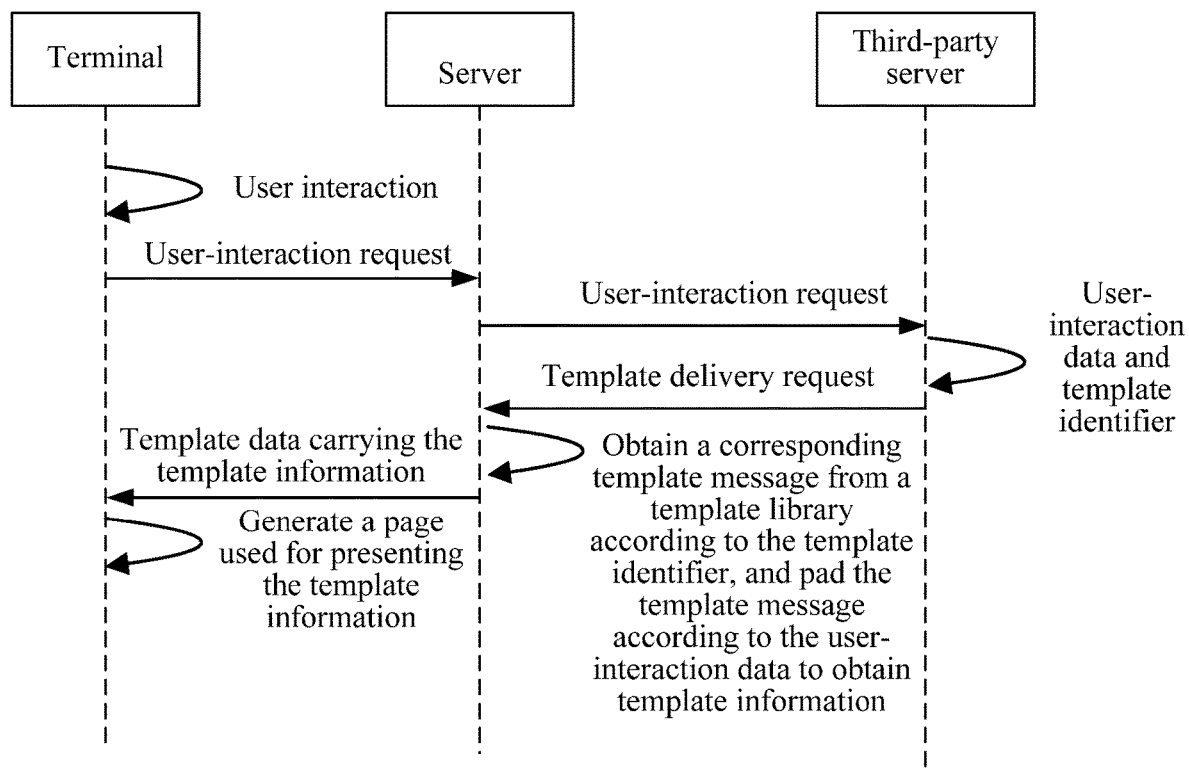
FIG. 14 is a sequence diagram showing that a terminal, a server, and a third-party server interact with each other to present template data according to an embodiment.

As shown in FIG. 13, an embodiment provides a template data presenting method. The method is described by using an example in which the method is applied to a terminal in the application environment. With reference to a schematic diagram in FIG. 14 of interaction between a terminal, a server, and a third-party server, the method includes the following steps:

Step S710. Obtain a user interaction, and generate a corresponding user-interaction request according to the user interaction.

Specifically, when the terminal interacts with the third-party server, the user interaction is formed by using an operation acting on a page corresponding to a third-party service and displayed by the terminal, and the user-interaction request is generated according to the user interaction. The user interaction includes a form submission behavior, a payment behavior, a subscription behavior, and the like, and is initiated by a user. The user-interaction request may carry a behavior identifier, used to distinguish between different user interactions. If the user interaction is a form submission behavior, the user-interaction request may carry a form identifier, and if the user interaction is a resource value transfer behavior, the user-interaction request may carry a resource transfer identifier.

Step S720. Send the user-interaction request to a server, so that the server forwards the user-interaction request to a third-party server, the third-party server obtains, according to the user-interaction request, corresponding user-interaction data and a template identifier that matches the user-interaction request, triggers a template delivery request according to the user-interaction request, where the template delivery request includes the user-interaction data and the template identifier, sends the template delivery request to the server, so that the server obtains a corresponding template message from a template library according to the template identifier, and pads the template message according to the user-interaction data to obtain template information.

Specifically, for interaction behaviors between the terminal and the third-party server, the server needs to forward the user-interaction request. The third-party server receives the user-interaction request, and triggers the template delivery request according to a preset rule. The preset rule may be self-defined according to needs. For example, it is self-defined whether the template delivery request needs to be triggered for a user interaction corresponding to a current user-interaction request, a time of triggering the template delivery request, a quantity of triggered template delivery requests, and a triggering condition are self-defined, for example, the template delivery request needs to be triggered after a response to the user interaction corresponding to the user-interaction request is completed. The user-interaction data is interaction data corresponding to the user-interaction request. Corresponding interaction data may be extracted from the user-interaction request, or interaction data may be extracted from a response result corresponding to the user-interaction request. The third-party server sends the template delivery request to the server. The server obtains a corresponding template message according to the template identifier, and pads corresponding key words respectively by using specific content corresponding to the user-interaction data, to obtain template information including specific content. The user-interaction data is data generated in real time according to an interaction behavior, so that the template information corresponds to different real-time information as the user-interaction data is different, to give dynamic real-time feedback to a user behavior. The corresponding template data is formed according to the template information, and the template data may further include presentation parameter information for presenting the template information. The user-interaction request may carry a user identifier or a terminal identifier, so that the server can determine the corresponding terminal according to the user identifier or the terminal identifier, and send the template data carrying the template information to the terminal.

Step S730. Receive template data that carries the template information and that is returned by the server, and generate a page used for presenting the template information. In other words, a second template message returned by the server is received, and a page used for presenting the second template message is generated.

Specifically, the terminal obtains a presentation parameter according to the template data, and generates, according to the presentation parameter, a presenting page corresponding to the template information.

In this embodiment, the user interaction is obtained, the corresponding user-interaction request is generated according to the user interaction, and the user-interaction request is sent to the server, so that the server forwards the user-interaction request to the third-party server, and the third-party server obtains, according to the user-interaction request, the corresponding user-interaction data and the template identifier that matches the user-interaction request, triggers the template delivery request according to the user-interaction request, where the template delivery request includes the user-interaction data and the template identifier, and sends the template delivery request to the server, so that the server obtains the corresponding template message from the template library according to the template identifier, pads the template message according to the user-interaction data to obtain the template information, receives the template data that carries the template information and that is sent by the server, and generates the page used for presenting the template information. Third-party service users themselves do not need to implement template messages through research and development, and the server obtains corresponding template messages from the template library according to the template identifiers, thereby improving the template message generation efficiency and the convenience of template data delivery. The template message can be delivered only through triggering by using the user-interaction request, thereby avoiding interference caused to the user because the third-party servers deliver the template messages by using self-defined rules. In addition, the template message does not need to be stored in a server corresponding to a third-party service, and one server performs storage and performs delivery by receiving the template delivery requests sent by the third-party servers, thereby implementing uniform delivery and management on template messages corresponding to third-party services.

In an embodiment, step S710 of obtaining the user interaction includes: obtaining an operation acting on a first page of a child application of a parent application running on an operating system.

Specifically, the user interaction is obtained by using the operation acting on the first page of the child application of the parent application. The child application is an application program attached to the parent application for running, and the child application may be downloaded, started, run, and closed by using the parent application. The parent application may be a social application, a dedicated application dedicated for supporting the child application, a file management application, a mail application, a game application, or the like. The social application includes an instant messaging application, an SNS application, a live broadcast application, or the like. The child application is an application implemented in an environment provided by the parent application. The child application may be specifically a social application, a file management application, a mail application, a game application, or the like. The user interaction may be performed on a page of each child application, to generate the user-interaction request. Different child applications correspond to different child application identifiers, delivery of a template message corresponding to a corresponding child application identifier may be triggered according to the user-interaction request, or different child applications may share a template message.

In an embodiment, after step S730, the method further includes: obtaining a jumping operation acting on a page used for presenting the template information, and presenting a second page on the child application according to the jumping operation.

Specifically, there is a jumping link on the page used for presenting the template information. Another page of the current child application may be jumped to through an operation acting on the jumping link, and another page may be quickly jumped to through the page of the template information, for example, a details page, to implement fast information browsing. In addition, page jumping is limited to a current child application.

In an embodiment, template key words corresponding to the template message are generated according to a configuration policy, and the user-interaction data corresponds to the template key words.

Figure 15:
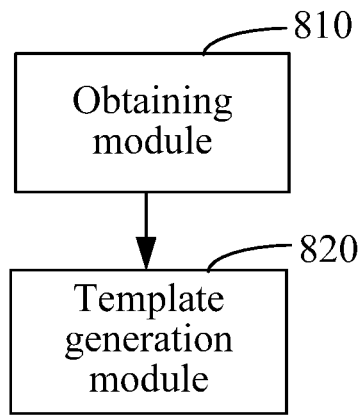
FIG. 15 is a structural block diagram of a template data processing device according to an embodiment.

As shown in FIG. 15, an embodiment provides a template data processing device, and including one or more memories and one or more processors. The one or more memories store one or more instruction modules, and the one or more instruction modules are configured to be executed by the one or more processors. The one or more instruction modules include: an obtaining module 810, configured to obtain a template subject and template key words matching the template subject; and a template generation module 820, configured to generate, according to the template key words, a template message matching the template subject; and generate a template identifier corresponding to the template message, associate the template identifier with the corresponding template message, and store the template identifier and the corresponding template message into a template library, where the template message is delivered to a corresponding terminal according to a template delivery request that carries the template identifier and that is sent by a third-party server, the template delivery request is triggered by the third-party server based on a user-interaction request, and the template identifier corresponds to the user-interaction request. In other words, a first template message matching the template subject is generated according to the template key words, where the first template message includes the template key words; and a template identifier corresponding to the first template message is generated, the template identifier is associated with the corresponding first template message, and the template identifier and the corresponding first template message are stored into the template library.

Figure 16:
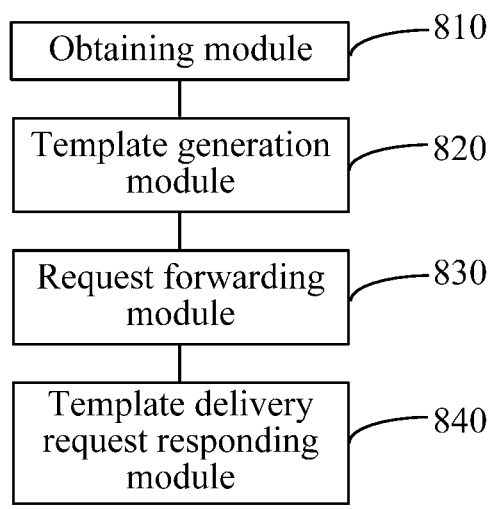
FIG. 16 is a structural block diagram of a template data processing device according to another embodiment.

In an embodiment, as shown in FIG. 16, the device further includes: a request forwarding module 830, configured to receive the user-interaction request sent by the terminal, and send the user-interaction request to the third-party server; and a template delivery request responding module 840, configured to receive the template delivery request that is triggered by the third-party server according to the user-interaction request, where the template delivery request includes the template identifier and user-interaction data, obtain a corresponding template message according to the template identifier, pad the template message according to the user-interaction data to obtain template information, and send template data carrying the template information to the terminal corresponding to the user-interaction request.

Figure 17:
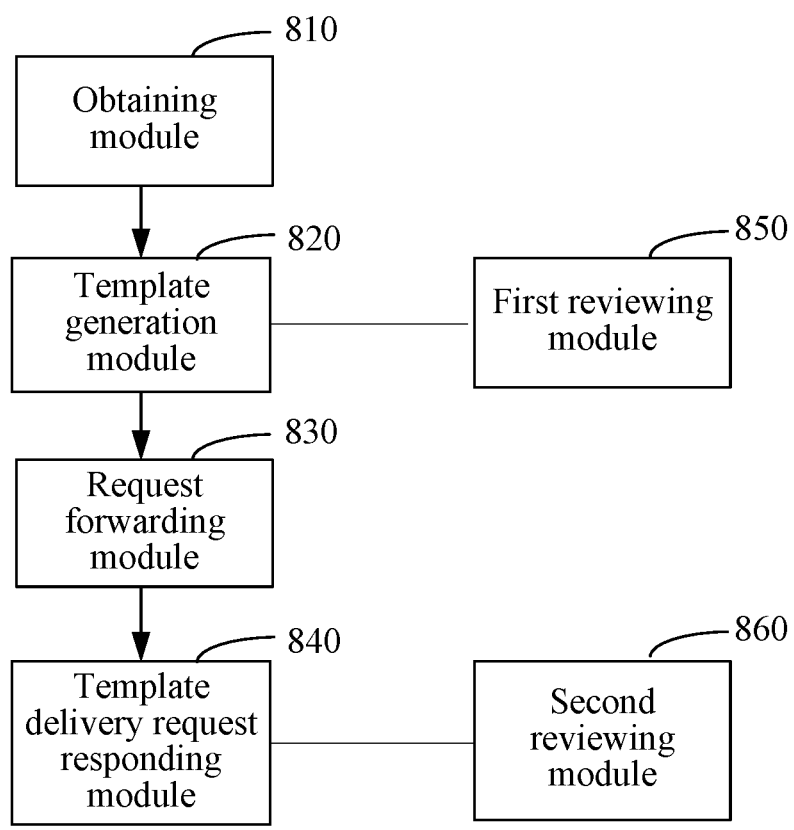
FIG. 17 is a structural block diagram of a template data processing device according to still another embodiment.

In an embodiment, as shown in FIG. 17, the device further includes a first reviewing module 850, configured to review the template message according to the template subject and the template key words, and if the review succeeds, perform the step of generating the template identifier corresponding to the template message, or otherwise, perform no processing; and/or a second reviewing module 860, configured to review a triggering condition of the template delivery request, and if the review succeeds, perform the step of obtaining the corresponding template message according to the template identifier, or otherwise, reject the template delivery request.

In an embodiment, the obtaining module 810 is further configured to search for a matched target template subject according to a subject key word, and if the target template subject does not exist, add a template subject corresponding to the subject key word.

In an embodiment, the obtaining module 810 is further configured to obtain candidate template key words matching the template subject, and screen the candidate template key words to obtain target template key words matching the template subject.

In an embodiment, the obtaining module 810 is further configured to search for matched target template key words matching template subject, and if the target template key words do not exist, add template key words corresponding to the template subject.

In an embodiment, the user interaction includes at least one of a form submission behavior and a resource value transfer behavior.

In an embodiment, a page corresponding to the user interaction is a page of a child application of a parent application running on an operating system.

Figure 18:
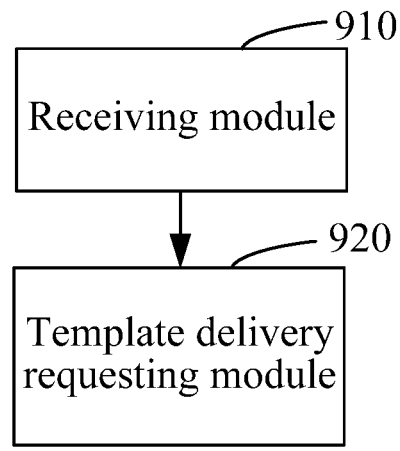
FIG. 18 is a structural block diagram of a template data requesting device according to an embodiment.

As shown in FIG. 18, an embodiment provides a template data requesting device, including one or more memories and one or more processors. The one or more memories store one or more instruction modules, and the one or more instruction modules are configured to be executed by the one or more processors. The one or more instruction modules include: a receiving module 910, configured to receive a user-interaction request forwarded by a server, and obtain, according to the user-interaction request, corresponding user-interaction data and a template identifier that matches the user-interaction request; and a template delivery requesting module 920, configured to trigger a template delivery request according to the user-interaction request, where the template delivery request includes the user-interaction data and the template identifier, and send the template delivery request to the server, so that the server obtains a corresponding template message from a template library according to the template identifier, pads the template message according to the user-interaction data to obtain template information, and sends template data carrying the template information to a terminal corresponding to the user-interaction request. In other words, the template delivery requesting module 920 is configured to trigger the template delivery request according to the user-interaction request, where the template delivery request includes the user-interaction data and the template identifier, and sends the template delivery request to the server.

Figure 19:
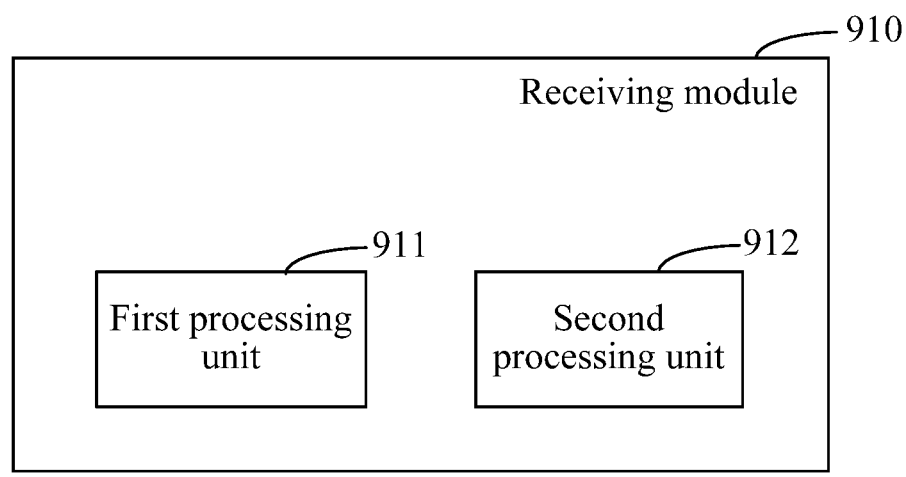
FIG. 19 is a structural block diagram of a receiving module according to an embodiment.

In an embodiment, as shown in FIG. 19, the receiving module 910 includes a first processing unit 911, configured to: if the user-interaction request corresponds to a form submission behavior, obtain a form identifier corresponding to the form submission behavior, obtain form data corresponding to the form identifier, and obtain a corresponding first template identifier according to the form identifier; and a second processing unit 912, configured to: if the user-interaction request corresponds to a resource value transfer behavior, obtain a resource transfer identifier corresponding to the resource value transfer behavior, obtain resource transfer information corresponding to the resource transfer identifier, and obtain a corresponding second template identifier according to the resource transfer identifier.

Figure 20:
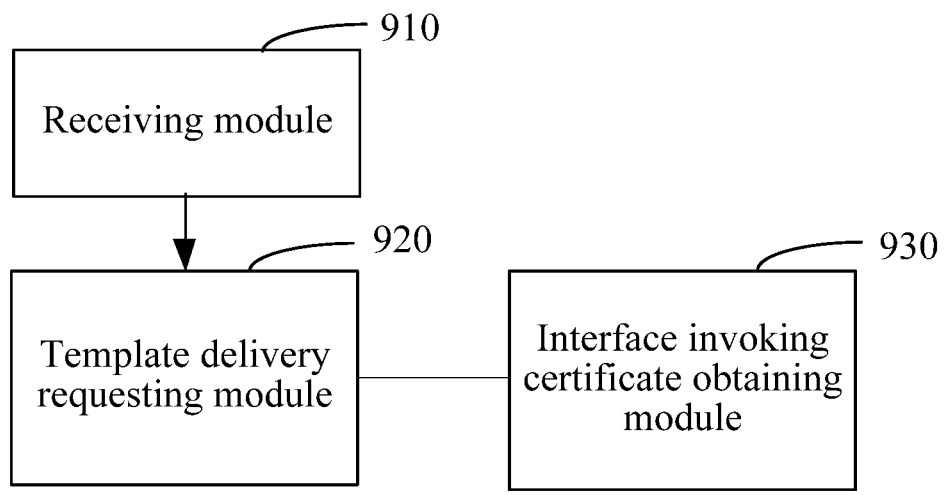
FIG. 20 is a structural block diagram of a template data requesting device according to another embodiment.

In an embodiment, as shown in FIG. 20, the device further includes an interface invoking certificate obtaining module 930, configured to send a certificate obtaining request to the server, where the certificate obtaining request includes a third-party user identifier and a corresponding third-party key, so that the server sends a corresponding interface invoking certificate according to the certificate obtaining request, where the template delivery requesting module 920 is further configured to send the template delivery request carrying the interface invoking certificate to the server, so that the server verifies template delivery permission according to the interface invoking certificate.

In an embodiment, a page corresponding to the user-interaction request is a page of a child application of a parent application running on an operating system.

In an embodiment, template key words corresponding to the template message are generated according to a configuration policy, and the user-interaction data corresponds to the template key words.

Figure 21:
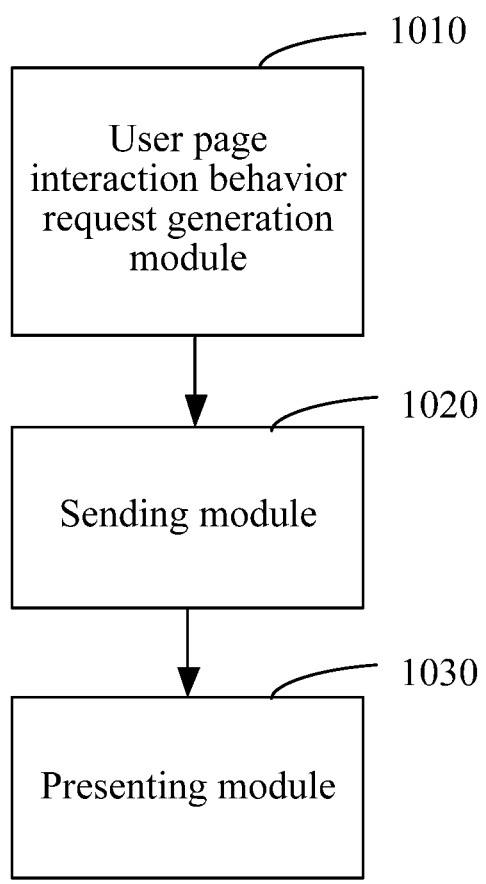
FIG. 21 is a structural block diagram of a template data presenting device according to an embodiment.

As shown in FIG. 21, an embodiment provides a template data presenting device, including: one or more memories and one or more processors. The one or more memories store one or more instruction modules, and the one or more instruction modules are configured to be executed by the one or more processors. The one or more instruction modules include: a user-interaction request generation module 1010, configured to obtain a user interaction, and generate a corresponding user-interaction request according to the user interaction; a sending module 1020, configured to send the user-interaction request to a server, so that the server forwards the user-interaction request to a third-party server, and the third-party server obtains, according to the user-interaction request, corresponding user-interaction data and a template identifier that matches the user-interaction request, triggers a template delivery request according to the user-interaction request, where the template delivery request includes the user-interaction data and the template identifier, and send the template delivery request to the server, so that the server obtains a corresponding template message from a template library according to the template identifier, and pads the template message according to the user-interaction data to obtain template information, in other words, the sending module 1020 is configured to send the user-interaction request to the server; and a presenting module 1030, configured to receive template data that carries the template information and that is returned by the server, and generate a page used for presenting the template information. In other words, the presenting module 1030 is configured to receive a second template message returned by the server, and generate a page used for presenting the second template message, where the second template message is generated by the server according to the template delivery request sent by the third-party server, the template delivery request includes the user-interaction data and the template identifier, and the second template message is obtained by padding, by using the user-interaction data, a first template message corresponding to the template identifier.

In an embodiment, the user-interaction request generation module 1010 is further configured to obtain an operation acting on a first page of a child application of a parent application running on an operating system.

Figure 22:
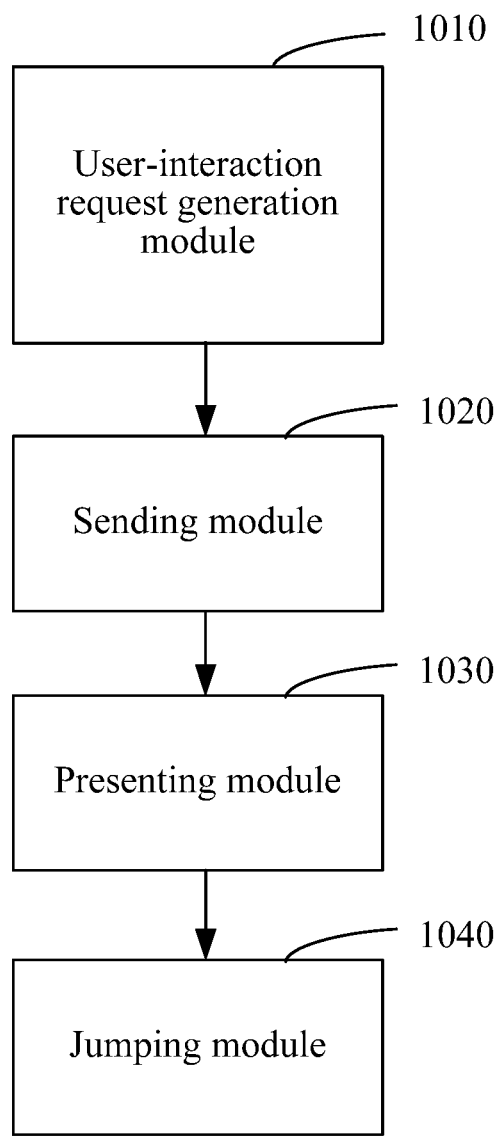
FIG. 22 is a structural block diagram of a template data presenting device according to another embodiment.

In an embodiment, as shown in FIG. 22, the device further includes a jumping module 1040, configured to obtain a jumping operation acting on a page used for presenting the template information, and present a second page on the child application according to the jumping operation.

In an embodiment, template key words corresponding to the template message are generated according to a configuration policy, and the user-interaction data corresponds to the template key words.

A person of ordinary skill in the art may understand that all or a part of processes in the method in the foregoing embodiment may be implemented by a computer program instructing relevant hardware. The program may be stored in a computer readable storage medium. For example, in the embodiments of the present disclosure, the program may be stored in a storage medium of a computer system, and is executed by at least one processor of the computer system, to implement processes of the embodiment of the foregoing method. The storage medium may be a magnetic disk, an optical disc, a read-only memory (ROM), a random access memory (RAM), or the like. Therefore, an embodiment of the present disclosure further provides a non-volatile computer readable storage medium, storing a computer program, and the steps of the foregoing method are implemented when the computer program is executed by a processor.

Technical features of the foregoing embodiments may be combined in any manner. For brevity of descriptions, not all possible combinations of the technical features in the foregoing embodiments are described. Provided that no contradiction exists between the combinations of these technical features, it should be considered that the combinations should fall within the scope of this specification.

The foregoing embodiment merely describes some implementations of the present disclosure, and the descriptions are specific and detailed, but cannot be understood as a limitation to the patent scope of the present disclosure. It should be noted that a person of ordinary skill in the art may make various variations and improvements without departing from the concept of the present disclosure, and theses shall belong to the protection scope of the present disclosure. Therefore, the protection scope of the patent of the present disclosure should be subject to the appended claims.

What is claimed is:

1. A method for processing template data, the method comprising:
   obtaining, by a device comprising a memory storing instructions and a processor in communication with the memory, a template subject and template key words matching the template subject;
   generating, by the device according to the template key words, a first template message matching the template subject, the first template message comprising the template key words;
   generating, by the device, a template identifier corresponding to the first template message;
   associating, by the device, the template identifier with the first template message; and
   storing, by the device, the template identifier and the first template message into a template library,
   wherein a page corresponding to a user-interaction behavior corresponding to a user-interaction request corresponding to the template identifier is a page of a child application of a parent application running on an operating system.

2. The method according to claim 1, further comprising:
   receiving, by the device, a second user-interaction request sent by a terminal, and sending the second user-interaction request to a third-party server;
   receiving, by the device, a template delivery request that is triggered by the third-party server according to the second user-interaction request, wherein the template delivery request comprises the template identifier and user-interaction data;
   obtaining, by the device, the first template message corresponding to the template identifier in the template delivery request, and padding, according to the user-interaction data in the template delivery request, the first template message to obtain a second template message; and
   sending, by the device, the second template message to the terminal corresponding to the second user-interaction request.

3. The method according to claim 1, further comprising:
   reviewing, by the device, the first template message according to the template subject and the template key words to determine whether the first template message satisfies a review condition; and
   in response to the determination that the first template message satisfies the review condition, generating, by the device, the template identifier corresponding to the first template message.

4. The method according to claim 1, further comprising:
   reviewing, by the device, a template delivery request to determine whether the template delivery request satisfies a triggering condition;
   in response to the determination that the template delivery request satisfies the triggering condition, obtaining, by the device, the first template message according to the template identifier in the template delivery request; and
   in response to the determination that the template delivery request does not satisfy the triggering condition, rejecting, by the device, the template delivery request.

5. The method according to claim 1, wherein the obtaining the template subject and the template key words matching the template subject comprises:
   searching, by the device, for a target template subject according to a subject key word; and
   when the target template subject does not exist, adding, by the device, a template subject corresponding to the subject key word into the template library.

6. The method according to claim 1, wherein the obtaining the template subject and the template key words matching the template subject comprises:
   obtaining, by the device, candidate template key words matching the template subject; and
   screening, by the device, the candidate template key words to obtain the template key words.

7. The method according to claim 1, wherein the obtaining the template subject and the template key words matching the template subject comprises:

searching, by the device, for target template key words matching the template subject; and when the target template key words do not exist, adding, by the device, template key words corresponding to the template subject into the template library.

8. The method according to claim 1, wherein the user-interaction behavior corresponding to the user-interaction request comprises at least one of:

a form submission behavior, or a resource value transfer behavior.

9. A device for processing template data, the device comprising:

a memory storing instructions; and a processor in communication with the memory, wherein, when the processor executes the instructions, the processor is configured to cause the device to:

obtain a template subject and template key words matching the template subject, generate, according to the template key words, a first template message matching the template subject, the first template message comprising the template key words, generate a template identifier corresponding to the first template message, associate the template identifier with the first template message, and store the template identifier and the first template message into a template library, wherein a page corresponding to a user-interaction behavior corresponding to a user-interaction request corresponding to the template identifier is a page of a child application of a parent application running on an operating system.

10. The device according to claim 9, wherein, when the processor executes the instructions, the processor is configured to further cause the device to:

receive a second user-interaction request sent by a terminal, and sending the second user-interaction request to a third-party server;

receive a template delivery request that is triggered by the third-party server according to the second user-interaction request, wherein the template delivery request comprises the template identifier and user-interaction data;

obtain the first template message corresponding to the template identifier in the template delivery request, and pad, according to the user-interaction data in the template delivery request, the first template message to obtain a second template message; and send the second template message to the terminal corresponding to the second user-interaction request.

11. The device according to claim 9, wherein, when the processor executes the instructions, the processor is configured to further cause the device to:

review the first template message according to the template subject and the template key words to determine whether the first template message satisfies a review condition; and in response to the determination that the first template message satisfies the review condition, generate the template identifier corresponding to the first template message.

12. The device according to claim 9, wherein, when the processor executes the instructions, the processor is configured to further cause the device to:

review a template delivery request to determine whether the template delivery request satisfies a triggering condition;

in response to the determination that the template delivery request satisfies the triggering condition, obtain the first template message according to the template identifier in the template delivery request; and in response to the determination that the template delivery request does not satisfy the triggering condition, reject the template delivery request.

13. The device according to claim 9, wherein, when the processor is configured to cause the device to obtain the template subject and the template key words matching the template subject, the processor is configured to further cause the device to:

search for a target template subject according to a subject key word; and when the target template subject does not exist, add a template subject corresponding to the subject key word into the template library.

14. The device according to claim 9, wherein, when the processor is configured to cause the device to obtain the template subject and the template key words matching the template subject, the processor is configured to further cause the device to:

obtain candidate template key words matching the template subject; and screen the candidate template key words to obtain the template key words.

15. A non-transitory computer readable storage medium storing instructions, wherein the instructions, when executed by a processor, cause the processor to:

obtain a template subject and template key words matching the template subject;

generate, according to the template key words, a first template message matching the template subject, the first template message comprising the template key words;

generate a template identifier corresponding to the first template message;

associate the template identifier with the first template message; and store the template identifier and the first template message into a template library wherein a page corresponding to a user-interaction behavior corresponding to a user-interaction request corresponding to the template identifier is a page of a child application of a parent application running on an operating system.

16. The non-transitory computer readable storage medium according to claim 15, wherein the instructions, when executed by the processor, further cause the processor to:

receive a second user-interaction request sent by a terminal, and sending the second user-interaction request to a third-party server;

receive a template delivery request that is triggered by the third-party server according to the second user-interaction request, wherein the template delivery request comprises the template identifier and user-interaction data;

obtain the first template message corresponding to the template identifier in the template delivery request, and pad, according to the user-interaction data in the template delivery request, the first template message to obtain a second template message; and send the second template message to the terminal corresponding to the second user-interaction request.

17. The non-transitory computer readable storage medium according to claim 15, wherein the instructions, when executed by the processor, further cause the processor to:
- review the first template message according to the template subject and the template key words to determine whether the first template message satisfies a review condition; and
- in response to the determination that the first template message satisfies the review condition, generate the template identifier corresponding to the first template message.

18. The non-transitory computer readable storage medium according to claim 15, wherein the instructions, when executed by the processor, further cause the processor to:
- review a template delivery request to determine whether the template delivery request satisfies a triggering condition;
- in response to the determination that the template delivery request satisfies the triggering condition, obtain the first template message according to the template identifier in the template delivery request; and
- in response to the determination that the template delivery request does not satisfy the triggering condition, reject the template delivery request.

19. The non-transitory computer readable storage medium according to claim 15, wherein, when the instructions cause the processor to obtain the template subject and the template key words matching the template subject, the instructions further cause the processor to:
- search for a target template subject according to a subject key word; and
- when the target template subject does not exist, add a template subject corresponding to the subject key word into the template library.

20. The non-transitory computer readable storage medium according to claim 15, wherein, when the instructions cause the processor to obtain the template subject and the template key words matching the template subject, the instructions cause the processor to:
- obtain candidate template key words matching the template subject; and
- screen the candidate template key words to obtain the template key words.

* * * * *